(12) United States Patent
Ono

(10) Patent No.: US 7,296,934 B2
(45) Date of Patent: Nov. 20, 2007

(54) OPTICAL TRANSMISSION MODULE AND MANUFACTURING METHOD THEREOF

(75) Inventor: Tadashi Ono, Tama (JP)

(73) Assignee: Mitsumi Electric Co., Ltd. (JP)

(*) Notice: Subject to any disclaimer, the term of this patent is extended or adjusted under 35 U.S.C. 154(b) by 107 days.

(21) Appl. No.: 11/068,677

(22) Filed: Feb. 28, 2005

(65) Prior Publication Data

US 2006/0098920 A1  May 11, 2006

(30) Foreign Application Priority Data

Nov. 9, 2004  (JP)  ............................. 2004-325087

(51) Int. Cl.
*G02B 6/38* (2006.01)
(52) U.S. Cl. ............................. 385/55; 385/53; 385/56; 385/69; 385/70; 385/71
(58) Field of Classification Search ................ 385/53, 385/56, 60, 66, 72, 76, 77, 78, 80, 107, 113, 385/86, 59, 88, 89, 114, 55, 69, 70, 71, 99
See application file for complete search history.

(56) References Cited

U.S. PATENT DOCUMENTS

| 4,805,981 | A | * | 2/1989 | Gould | ........................ 385/104 |
| 5,214,730 | A | * | 5/1993 | Nagasawa et al. | ............ 385/59 |
| 5,555,332 | A | * | 9/1996 | Dean et al. | ................... 385/53 |
| 6,198,865 | B1 | * | 3/2001 | Risch | ........................ 385/113 |
| 6,565,261 | B1 | * | 5/2003 | Uchiyama et al. | ............ 385/60 |
| 2003/0068153 | A1 | * | 4/2003 | Suzuki | ....................... 385/137 |

FOREIGN PATENT DOCUMENTS

JP  05-264862  10/1993  ............. 385/114 X

* cited by examiner

*Primary Examiner*—Brian M. Healy
(74) *Attorney, Agent, or Firm*—Anderson Kill & Olick, P.C.

(57) ABSTRACT

An optical transmission module is disclosed that comprises an optical element having an optical path formed therein, optical connection parts respectively arranged on both sides of the optical element so as to connect the optical element to plural optical fibers, and reinforcement parts. The reinforcement parts are applied to a part of or an entire circumference of respective connected portions between the optical element and the optical connection parts, and then cured to reinforce connections between the optical element and the optical connection parts.

6 Claims, 10 Drawing Sheets

OPTICAL TRANSMISSION MODULE AND MANUFACTURING METHOD THEREOF

BACKGROUND OF THE INVENTION

1. Field of the Invention

The present invention relates to an optical transmission module and a manufacturing method thereof, and particularly relates to an optical transmission module having an optical element with an optical circuit formed therein and optical connection parts adapted to connect optical fibers to the optical element.

2. Description of the Related Art

In recent years, with a rapid progress in optical communications, enhancement of communication speed and transmission capacity has been promoted. Wavelength-Division Multiplexing (WDM), which is a multiplexing technique using lights with various wavelengths and capable of supporting such enhancement, is gaining widespread use in optical communication systems. The WDM requires highly-accurate optical components for enabling multiplexing and demultiplexing of lights with a wavelength interval of 1 nm or less.

As is commonly known in the art of optical communications, various optical elements are used in transmission channels formed by optical fibers (see, for example, Japanese Patent Laid-Open Publication No. 05-264862). Among the optical components, waveguide components are remarkable in that they are mass-producible and applicable to LSI. Especially, expectations for Planar Lightwave Circuit (PLC), which is one of the waveguide components, is high because it can be connected to optical fibers with a low optical transmission loss and can integrate a number of optical functions therein.

A PLC substrate having such a PLC optically connected to optical fibers is therefore used in high-speed and large-capacity optical communications. The PLC substrate is connected to the optical fibers by fiber arrays, and the fiber arrays are connected to the PLC substrate by optical path forming resins.

Conventionally, the optical elements having PLCs have been made of quartz, Pyrex (™), or the like. However, with recent developments for size and weight reduction and easier production, the core and cladding of optical elements having PLCs can be formed by laminating polymer resins with different refractive indexes on a silicon substrate.

FIG. 8 shows a perspective view of a related-art optical transmission module 10, and FIG. 9 shows side and top views of the optical transmission module 10.

The optical transmission module 10 comprises an optical element 30, and fiber arrays 21 and 22 for connecting optical fibers 11, 12 and 13 to the optical element 30.

The fiber array 21 holds the optical fiber 11, an end face of which is exposed from an end face of the fiber array 21 in the direction of an arrow X2. The fiber array 22 holds the optical fibers 12 and 13, an end face of each of which is exposed from an end face of the fiber array 22 in the direction of an arrow X1. The fiber arrays 21 and 22 are typically made of quartz or a glass material. The end face of the fiber array 21 in the direction of the arrow X2 is bonded to the optical element 30 through an optical path forming resin 41 so as to match the end face of the optical fiber 11 and an end face of an optical path formed in the optical element 30. The end face of the fiber array 22 in the direction of the arrow X1 is bonded to the optical element 30 through an optical path forming resin 42 so as to match the end faces of the optical fibers 12 and 13 and end faces of optical paths formed in the optical element 30.

The following describes the optical element 30 in detail.

FIG. 10 shows a perspective view of the optical element 30.

The optical element 30 is adapted to branch an incident light output and output branched lights form a waveguide, comprising a substrate 31, a lower cladding layer 32, a core 33, and an upper cladding layer 34. The substrate 31 is, for example, a silicon (Si) substrate. The lower cladding layer 32, the core 33, the upper cladding layer 34 are resin laminations formed on the substrate 31.

The following describes a manufacturing method of the optical element 30.

First, the lower cladding layer 32 is formed on the substrate 31. The lower cladding layer 32 is typically made of transparent resin such as fluorinated polyimide. The lower cladding layer 32 is formed by, for example, forming a polyamic acid layer on the substrate 31 with a spin-coating method, and imidizing the layer through a heat treatment.

Then, the core 33 is formed on the lower cladding layer 32. The core 33 as a waveguide is made of the same fluorinated polyimide as the lower cladding layer 32 and the upper cladding layer 34. The composition of the resin of the core 33 is adjusted to have a refractive index different from that of the lower cladding layer 32 and the upper cladding layer 34. For example, when the refractive index of the lower cladding layer 32 and the upper cladding layer 34 is n1 and the refractive index of the core 33 is n2, the composition of the resin is adjusted to have $$n1 < n2.$$

Herein, the refractive index n1 and n2 are, for example, n1=1.525, n2=1.531.

For forming the core 33, a polyamic acid layer is formed uniformly on the lower cladding layer 32 with a spin-coating method, and the layer is imidized through a heat treatment to form a transparent resin layer. Then, the transparent resin layer is coated with a patterned resist, and is dry-etched by a RIE (Reactive Ion Etching) machine to have the lower cladding layer 32 exposed. In this process, a part coated with a photoresist remains unetched to keep the transparent resin layer thereunder. Then, the remaining photoresist is removed. In this way, the core 33 with a desired pattern is formed. The thickness of the core 33 is around 9 through 10 μm, which is substantially equal to the diameter of the optical fibers 11, 12 and 13.

Next, the upper cladding layer 34 is formed to cover the upper and side surfaces of the core 33. The upper cladding layer 34 is made of the same fluorinated polyimide as the lower cladding layer 32, and the composition thereof is adjusted to have the refractive index n1, which is the same refractive index as the lower cladding layer 32. The upper cladding layer 34 is formed by, for example, forming a polyamic acid layer with a spin-coating method, and imidizing the layer through a heat treatment.

In this way, the optical element 30 having a waveguide with a desired pattern is formed.

The optical element 30 having polymer resins with different refractive indexes on the silicon substrate cannot have a resin material on the upper, side, and bottom surfaces thereof due to a large influence of the refractive index. If the optical element 30 has the resin material on those surfaces, a light passing through the core 33 is lost. For this reason, the optical element 30 is connected to the fiber arrays 21 and 22 only at the end faces thereof.

However, the end faces of the optical element 30 are small, so that the connection areas between the optical element 30 and the fiber arrays 21 and 22 are also small. This makes connections between the optical element 30 and the fiber arrays 21 and 22 weak. Therefore, the optical transmission module 10 with a silicon substrate described above is disadvantageous in this respect.

SUMMARY OF THE INVENTION

An object of the present invention is to provide an optical transmission module and a manufacturing method thereof to overcome at least one disadvantage described above. The specific object of the present invention is to provide an optical transmission module and a manufacturing method thereof to strengthen connections between fiber arrays and an optical element with minimum optical loss.

According to an aspect of the present invention, there is provided an optical transmission module, comprising an optical element having an optical path formed therein, optical connection parts respectively arranged on both sides of the optical element so as to connect the optical element to plural optical fibers, and reinforcement parts applied to a part of or an entire circumference of respective connected portions between the optical element and the optical connection parts and cured to reinforce connections between the optical element and the optical connection parts.

The reinforcement parts are preferably made of a resin material with hardness lower than the hardness of a material of the optical element, a material of the optical connection parts, and an optical path forming resin connecting the optical element and the optical connection parts.

It is preferable that the Young's modulus of the resin material of the reinforcement parts be approximately $9.0 \times 10^9$ or lower.

It is also preferable that the Young's modulus of the resin materials of the reinforcement parts be approximately $1.0 \times 10^4$ or higher.

It is also preferable that the reinforcement parts be respectively formed as fillets on the corresponding connected portions between the optical element and the optical connection parts.

According to another aspect of the present invention, there is provided a manufacturing method of an optical transmission module including an optical element having an optical path formed therein, and optical connection parts respectively arranged on both sides of the optical element so as to connect the optical element to plural optical fibers. The method comprises a connecting step of connecting the optical element to the optical connection parts by an optical path forming resin, and a reinforcing step of applying a resin to a part of or an entire circumference of connected portions between the optical element and the optical connection parts and curing the resin to reinforce connections between the optical element and the optical connection parts, after the connecting step in which the optical element and the optical connection parts are connected by the optical path forming resin.

According to the present invention, since there are reinforcement parts applied to a part of or an entire circumference of the respective connected portions between the optical element and the optical connection parts and cured to reinforce connections between the optical element and the optical connection parts, the connections between the optical element and the optical connection parts can be reinforced with minimum optical loss.

DETAILED DESCRIPTION OF THE PREFERRED EMBODIMENT

First Embodiment

Figure 1:
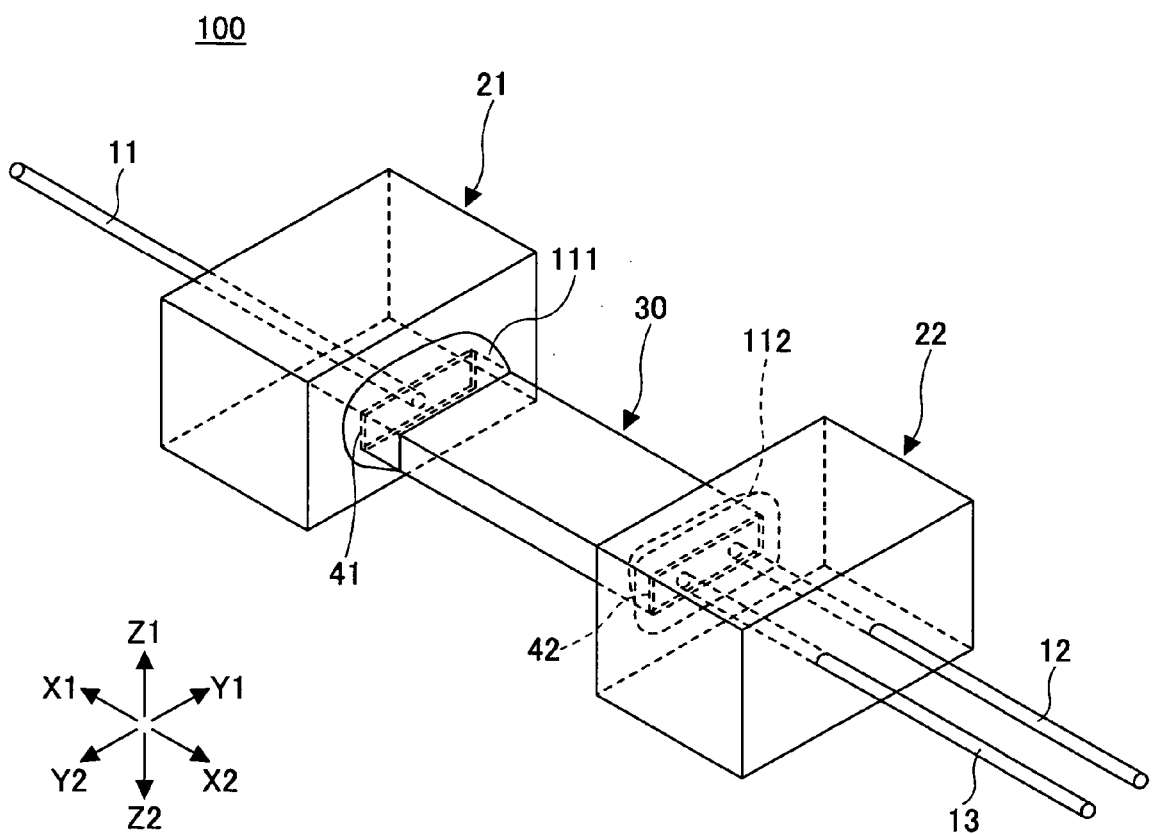
FIG. 1 shows a perspective view of an optical transmission module according to a first embodiment of the present invention.
Figure 2A:
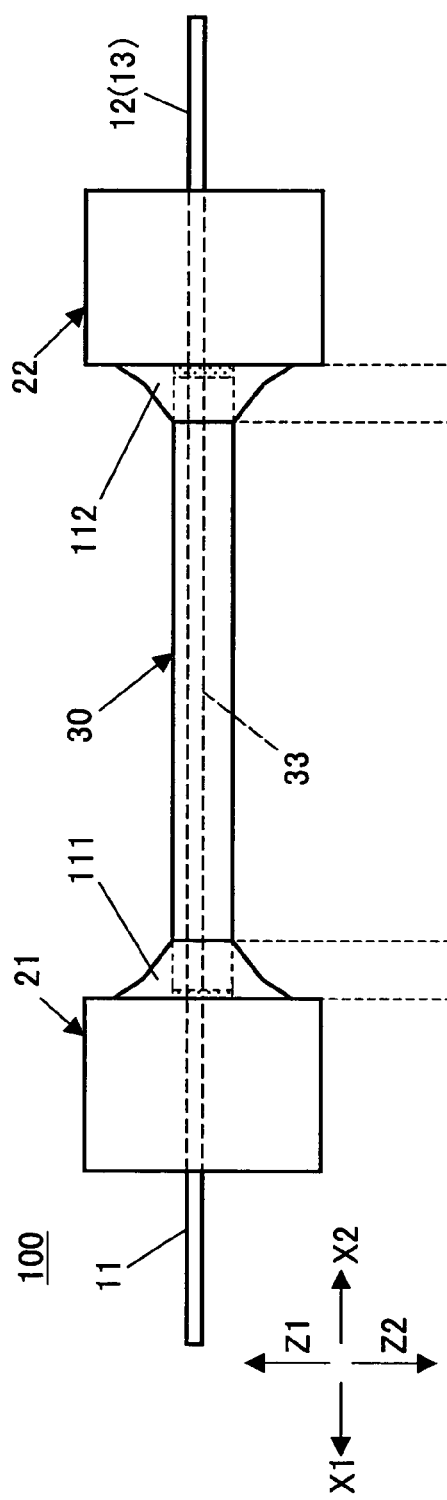
FIG. 2 shows side and top views of the optical transmission module according to the first embodiment of the present invention.
Figure 2B:
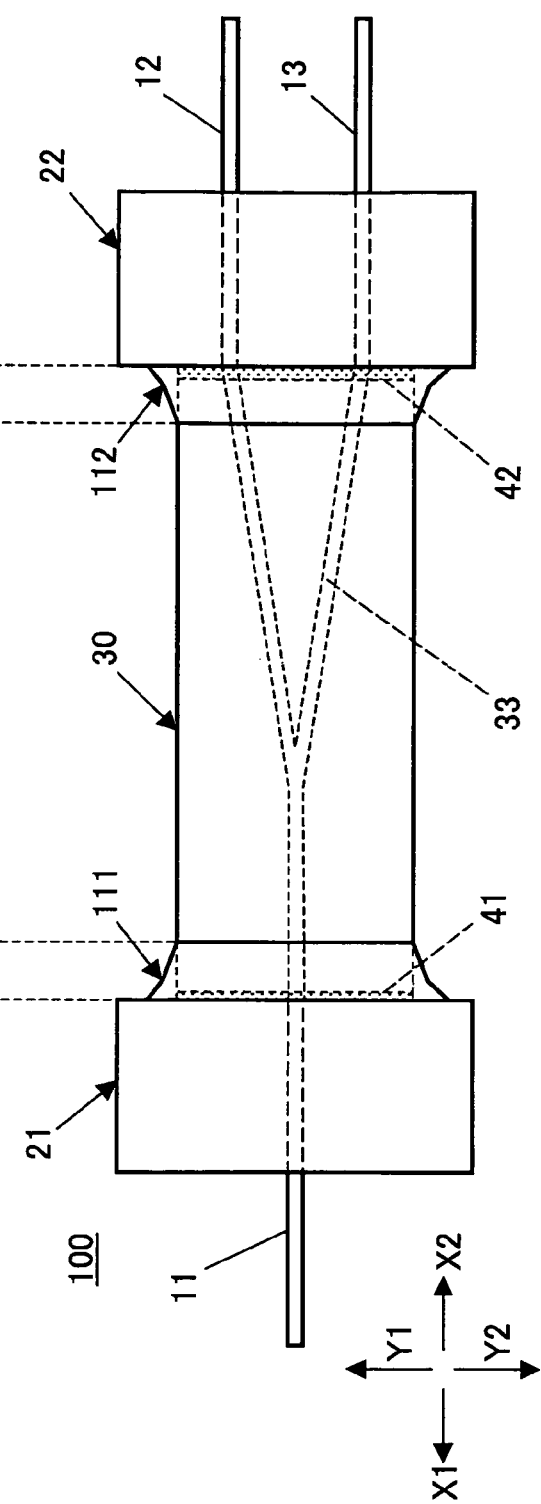
Figure 8:
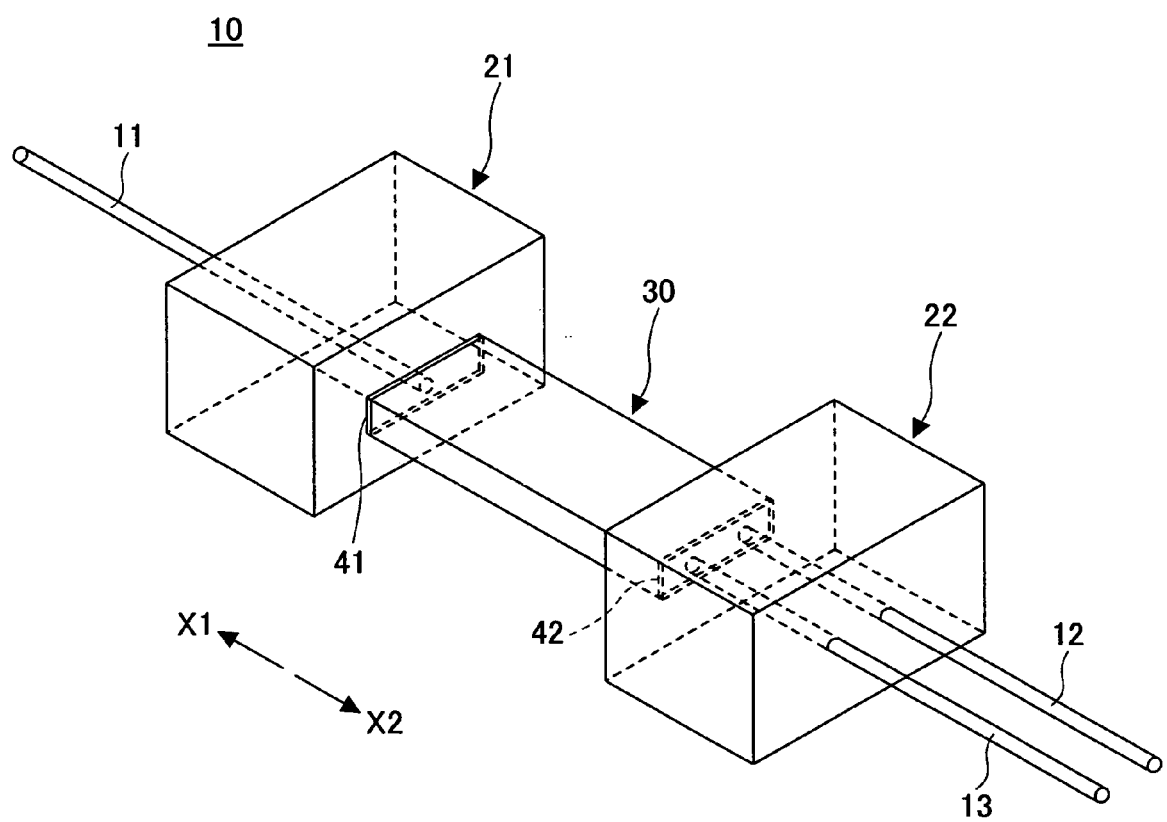
FIG. 8 shows a perspective view of a related-art optical transmission module.
Figure 9:
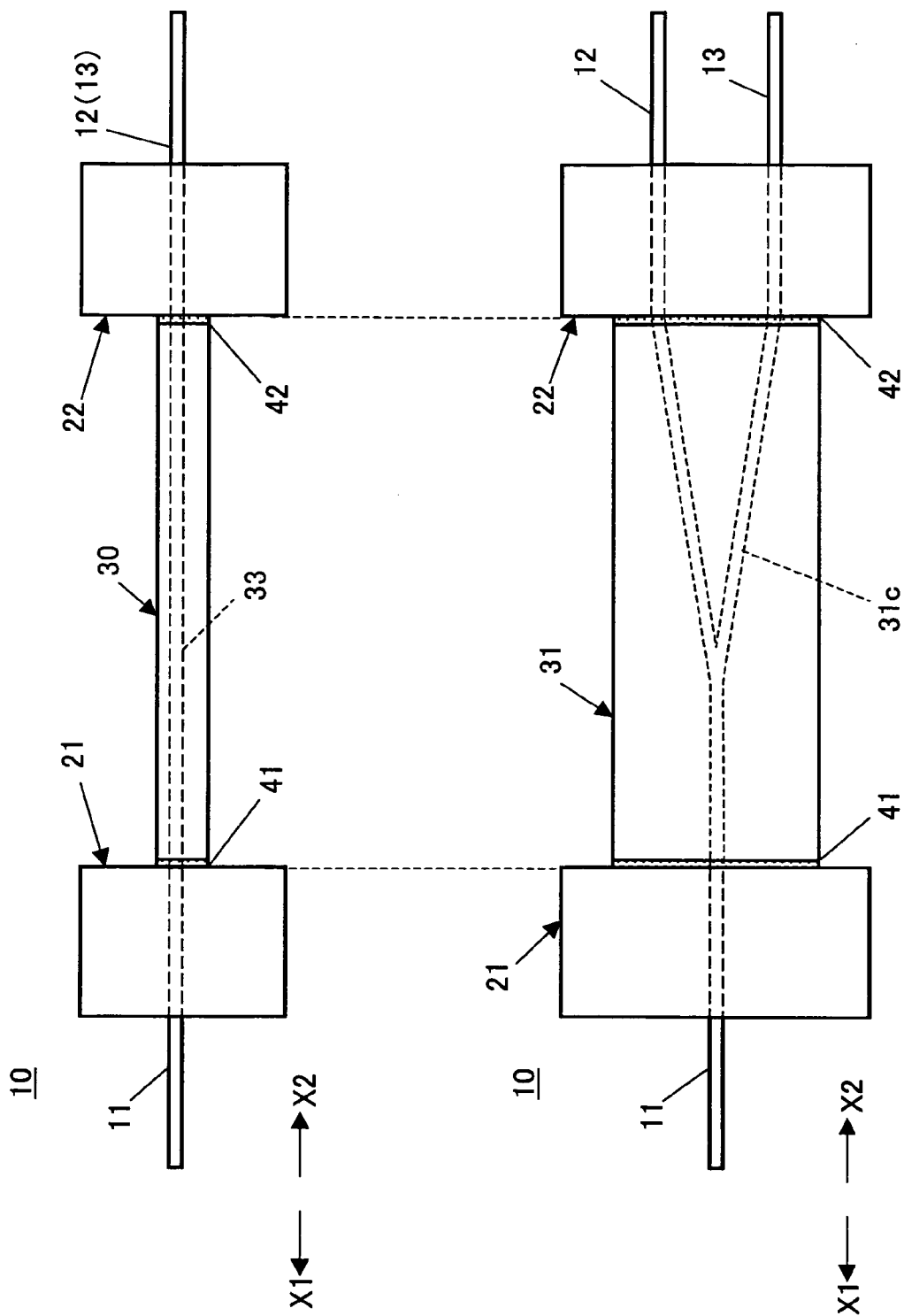
FIG. 9 shows side and top views of the related-art optical transmission module.
Figure 10:
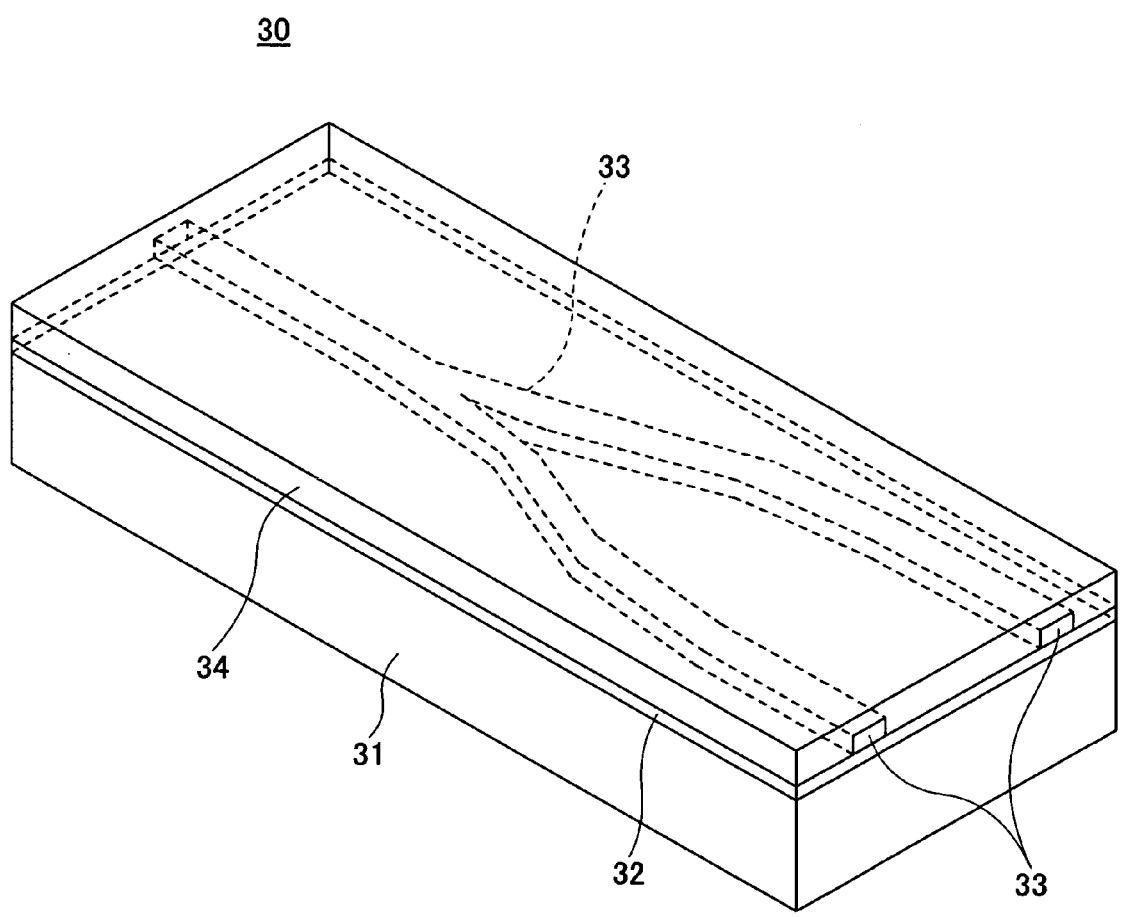
FIG. 10 shows a perspective view of an optical element.

FIG. 1 shows a perspective view of an optical transmission module 100 according to a first embodiment of the present invention, and FIG. 2 shows side and top views of the optical transmission module 100. In FIGS. 1 and 2, elements same as those in FIGS. 8 and 9 are denoted by the same reference numbers, and they are not further described here.

The optical transmission module 100 according to the first embodiment has a fillet-like reinforcement portion 111 around a connected portion between the fiber array 21 and the optical element 30, and a reinforcement portion 112 around a connected portion between the fiber array 22 and the optical element 30. The fiber arrays 21 and 22 correspond to optical connection parts in the following claims.

The reinforcement portion 111 is made of a resin material, such as a silicon-based resin material, with hardness lower than the resin material of the optical element 30, the resin material of the fiber array 21, and the optical path forming resin 41 connecting the optical element 30 to the fiber array 21.

Figure 3:
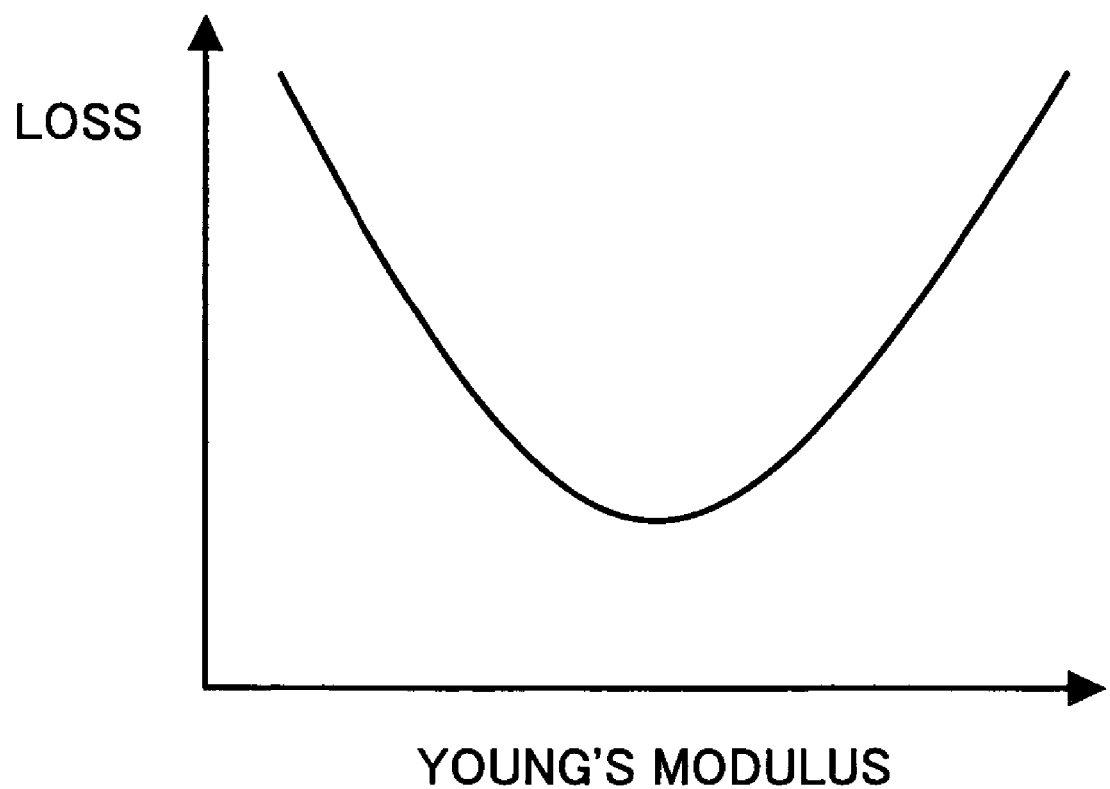
FIG. 3 is a graph showing characteristics of optical loss at reinforcement portions in relation to Young's modulus.

FIG. 3 is a graph showing characteristics of optical loss at the reinforcement portions 111 and 112 relative to the Young's modulus.

The optical loss has the characteristic as shown in FIG. 3 in relation to Young's modulus of the reinforcement portions 111 and 112. For example, it was found from experiment that the optical loss at the connected portions between the optical element 30 and the fiber arrays 21 and 22 is reduced when a resin material with the Young's modulus in a cured state of approximately $1.0 \times 10^4$ through $9.0 \times 10^9$ is used as the resin material of the reinforcement portions 111 and 112.

According to the first embodiment, the connection between the fiber arrays 21 and 22 and the optical element 30 is strengthened by forming the fillet-like reinforcement portions 111 and 112 around the connected portions between the fiber arrays 21 and 22 and the optical element 30. Especially, the optical loss is minimized when a silicon-based resin with the Young's modulus in a cured state of approximately $1.0 \times 10^4$ through $9.0 \times 10^9$ is used as the reinforcement portions 111 and 112.

The following describes a manufacturing method of the optical transmission module 100 of the first embodiment.

First, the end face of the optical element 30 in the direction of the arrow X1 and the fiber array 21 are connected through the optical path forming resin 41 so as to match the optical paths thereof, and the optical path forming resin 41 is cured. Likewise, the end face of the optical element 30 in the direction of the arrow X2 and the fiber array 22 are connected through the optical path forming resin 42 so as to match the optical paths thereof, and the optical path forming resin 42 is cured. The fiber arrays 21 and 22 are thus bonded to the optical element 30 respectively at the end faces in the directions of the arrow X1 and the arrow X2.

Next, a reinforcement resin material is applied to the entire circumference of the connected portion between the end face of the optical element 30 in the direction of the arrow X1 and the fiber array 21, and cured through addition/condensation reactions by, for example, a heat treatment and an ultraviolet radiation to form the reinforcement portion 111. Likewise, a reinforcement resin material is applied to the entire circumference of the connected portion between the end face of the optical element 30 in the direction of the arrow X2 and the fiber array 22, and is cured through addition/condensation reactions by, for example, a heat treatment and an ultraviolet radiation to form the reinforcement portion 112. In this way, the reinforcement portions 111 and 112 are respectively formed on the entire circumferences of the connected portions between the end faces of the optical element 30 in the directions of the arrows X1 and X2 and the fiber arrays 21 and 22.

Since the reinforcement portions 111 and 112 formed on the connected portions between the optical element 30 and the fiber arrays 21 and 22 are made of the resin material with hardness that minimizes the optical loss, i.e., with the Young's modulus of approximately $1.0 \times 10^4$ through $9.0 \times 10^9$, the connections between the optical element 30 and the fiber arrays 21 and 22 are strengthened while minimizing the optical loss at the connected portions between the optical element 30 and the fiber arrays 21 and 22 and therearound.

Second Embodiment

Figure 4:
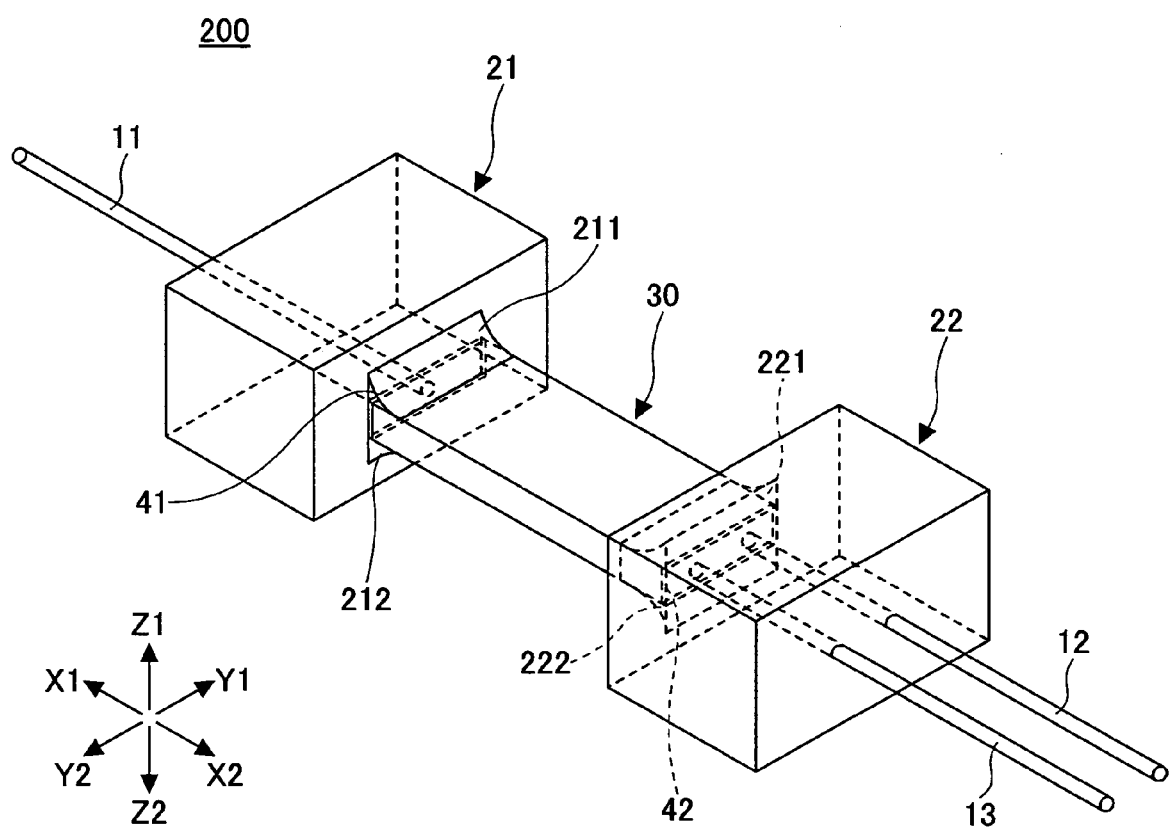
FIG. 4 shows a perspective view of an optical transmission module according to a second embodiment of the present invention.
Figure 5:
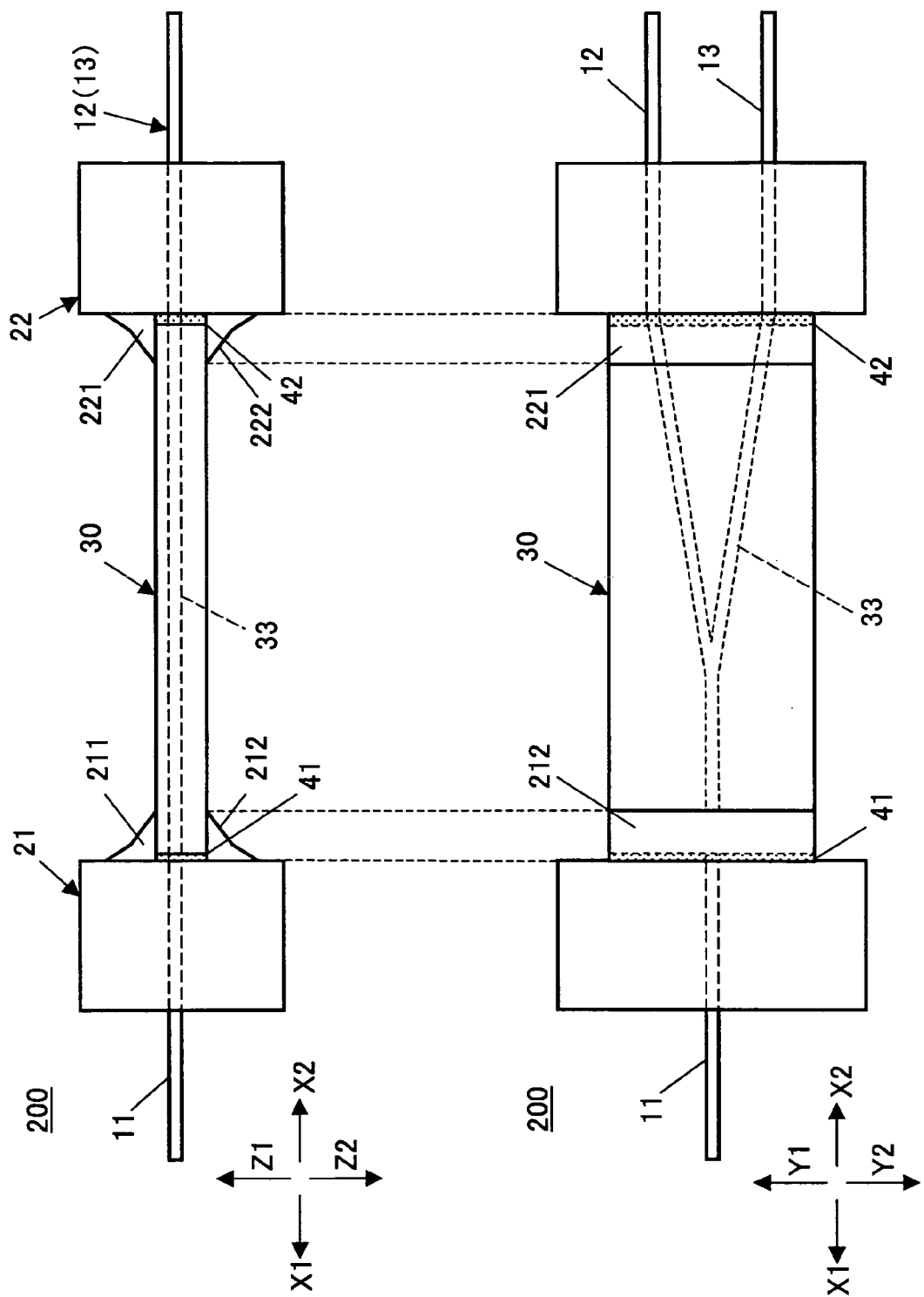
FIG. 5 shows side and top views of the optical transmission module according to the second embodiment of the present invention.

FIG. 4 shows a perspective view of an optical transmission module 200 according to a second embodiment of the present invention, and FIG. 5 shows side and top views of the optical transmission module 200. In FIGS. 4 and 5, elements the same as those in FIGS. 8 and 9 are denoted by the same reference numbers, and they are not further described here.

The optical transmission module 200 of the second embodiment is different from that of the first embodiment in the position of reinforcement portions 211, 212, 221 and 222.

The reinforcement portion 211 is made of a resin material with the Young's modulus in a cured state of approximately $1.0 \times 10^4$ through $9.0 \times 10^9$, which is applied and cured like a fillet on the edges of the optical element 30 and the fiber array 21 in the direction of an arrow Z1. The reinforcement portion 212 is made of a resin material with the Young's modulus in a cured state of approximately $1.0 \times 10^4$ through $9.0 \times 10^9$, which is applied and cured like a fillet on the edges of the optical element 30 and the fiber array 21 in the direction of an arrow Z2.

The reinforcement portion 221 is made of a resin material with the Young's modulus in a cured state of approximately $1.0 \times 10^4$ through $9.0 \times 10^9$, which is applied and cured like a fillet on the edges of the optical element 30 and the fiber array 22 in the direction of the arrow Z1. The reinforcement portion 222 is made of a resin material with the Young's modulus in a cured state of approximately $1.0 \times 10^4$ through $9.0 \times 10^9$, which is applied and cured like a fillet on the edges of the optical element 30 and the fiber array 22 in the direction of the arrow Z2.

According to the second embodiment, since the reinforcement portions 211, 212, 221 and 222 are formed only on the edges of the optical element 30 and the fiber arrays 21 and 22 in the directions of the arrows Z1 and Z2, the optical loss at the connected portions between the optical element 30 and the fiber arrays 21 and 22 is reduced.

Third Embodiment

Figure 6:
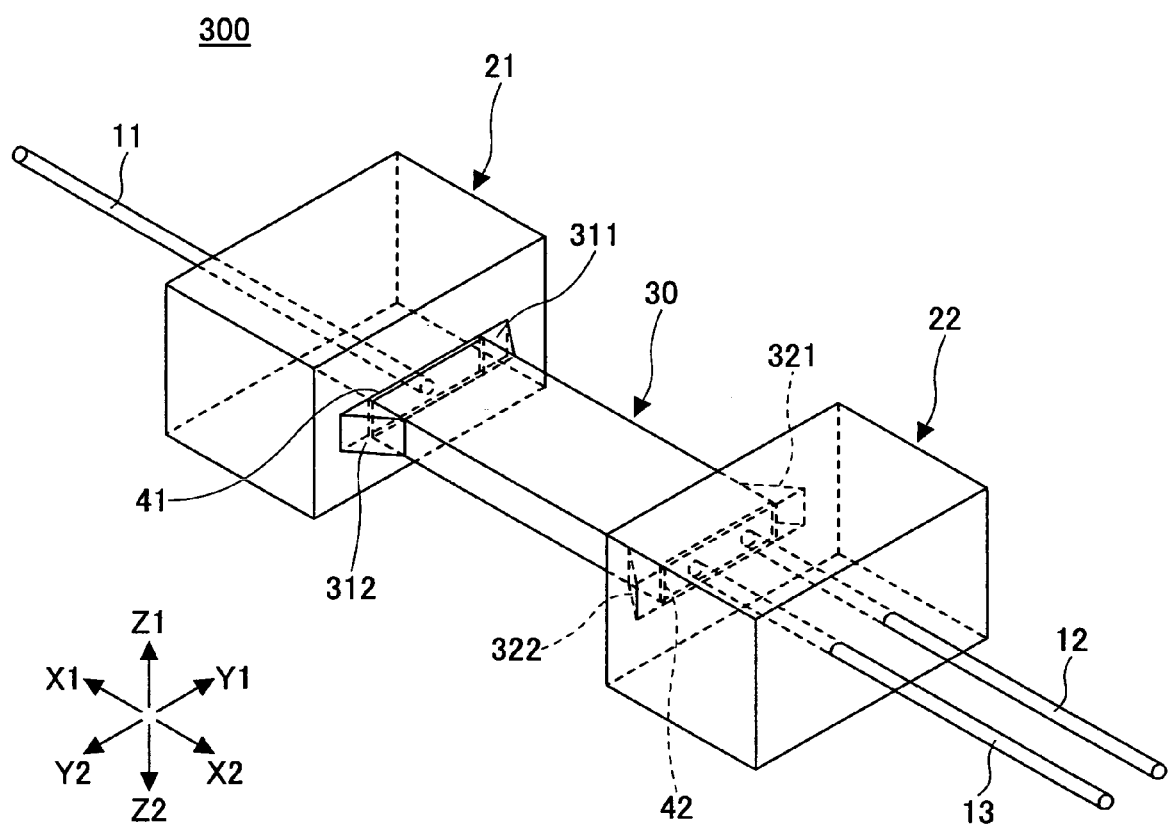
FIG. 6 shows a perspective view of an optical transmission module according to a third embodiment of the present invention.
Figure 7:
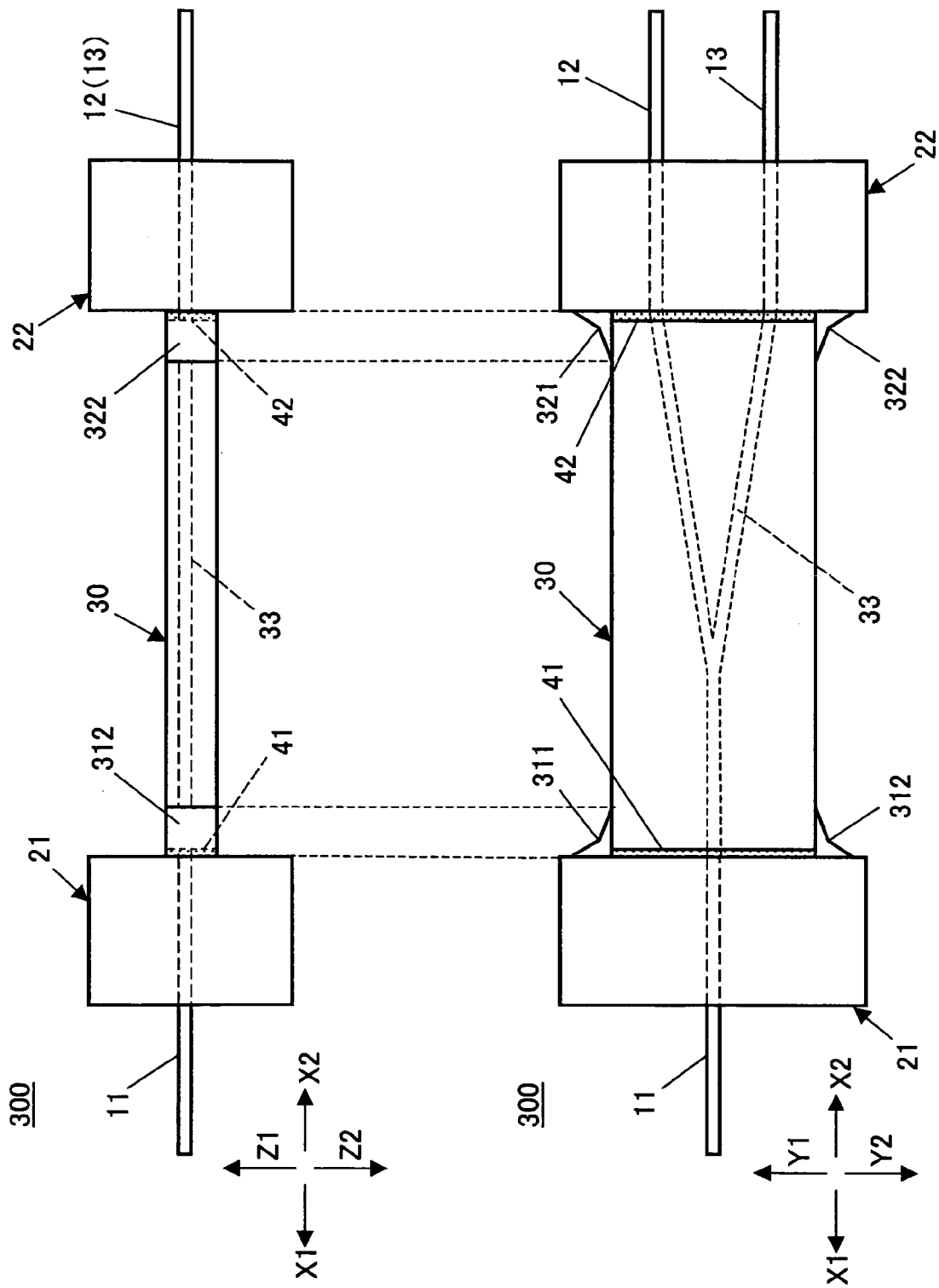
FIG. 7 shows side and top views of the optical transmission module according to the third embodiment of the present invention.

FIG. 6 shows a perspective view of an optical transmission module 300 according to a third embodiment of the present invention, and FIG. 7 shows side and top views of the optical transmission module 300. In FIGS. 6 and 7, elements the same as those in FIGS. 8 and 9 are denoted by the same reference numbers, and they are not further described here.

The optical transmission module 300 of the third embodiment is different from those of the first and second embodiments in the position of reinforcement portions 311, 312, 321 and 322.

The reinforcement portion 311 is made of a resin material with the Young's modulus in a cured state of approximately $1.0 \times 10^4$ through $9.0 \times 10^9$, which is applied and cured like a fillet on the edges of the optical element 30 and the fiber array 21 in the direction of an arrow Y1. The reinforcement portion 312 is made of a resin material with the Young's modulus in a cured state of approximately $1.0 \times 10^4$ through $9.0 \times 10^9$, which is applied and cured like a fillet on the edges of the optical element 30 and the fiber array 21 in the direction of an arrow Y2.

The reinforcement portion 321 is made of a resin material with the Young's modulus in a cured state of approximately $1.0 \times 10^4$ through $9.0 \times 10^9$, which is applied and cured like a fillet on the edges of the optical element 30 and the fiber array 22 in the direction of the arrow Y1. The reinforcement portion 322 is made of a resin material with the Young's modulus in a cured state of approximately $1.0 \times 10^4$ through $9.0 \times 10^9$, which is applied and cured like a fillet on the edges of the optical element 30 and the fiber array 22 in the direction of the arrow Y2.

According to the third embodiment, since the reinforcement portions 311, 312, 321 and 322 are formed only on the edges of the optical element 30 and the fiber arrays 21 and 22 in the directions of the arrows Y1 and Y2, the optical loss at the connected portions between the optical element 30 and the fiber arrays 21 and 22 is reduced.

[Others]

While the optical element 30 that branches a light into two is exemplified in the above embodiments, the present invention is applicable to other types of optical elements without being limited to the above specific optical element 30.

The present application is based on Japanese Priority Application No. 2004-325087 filed on Nov. 9, 2004, with the Japanese Patent Office, the entire contents of which are hereby incorporated by reference.

What is claimed is:

1. An optical transmission module, comprising:
   an optical element having an optical path formed therein;
   optical connection parts respectively arranged on both sides of the optical element so as to connect the optical element to a plurality of optical fibers; and
   reinforcement parts applied to a part of or an entire circumference of respective connected portions between the optical element and the optical connection parts and cured to reinforce connections between the optical element and the optical connection parts.

2. The optical transmission module as claimed in claim 1, wherein the reinforcement parts are made of a resin material with hardness lower than hardness of a material of the optical element, a material of the optical connection parts, and an optical path forming resin connecting the optical element and the optical connection parts.

3. The optical transmission module as claimed in claim 2, wherein the Young's modulus of the resin material of the reinforcement parts is approximately $9.0 \times 10^9$ or lower.

4. The optical transmission module as claimed in claim 3, wherein the Young's modulus of the resin materials of the reinforcement parts is approximately $1.0 \times 10^4$ or higher.

5. The optical transmission module as claimed in claim 1, wherein the reinforcement parts are respectively formed as fillets on the corresponding connected portions between the optical element and the optical connection parts.

6. A manufacturing method of an optical transmission module including an optical element having an optical path formed therein, and optical connection parts respectively arranged on both sides of the optical element so as to connect the optical element to a plurality of optical fibers, comprising:
   a connecting step of connecting the optical element to the optical connection parts by an optical path forming resin; and
   a reinforcing step of applying a resin to a part of or an entire circumference of connected portions between the optical element and the optical connection parts and curing the resin to reinforce connections between the optical element and the optical connection parts, after the connecting step in which the optical element and the optical connection parts are connected by the optical path forming resin.

\* \* \* \* \*